United States Patent [19]

Yokouchi et al.

[11] Patent Number: 4,942,468
[45] Date of Patent: Jul. 17, 1990

[54] IMAGE INPUT DEVICE

[75] Inventors: Hisatake Yokouchi; Takakazu Huno, both of Tokyo; Yoichi Onodera, Hachioji; Kouichi Koike; Masayuki Tsuneoka, both of Kashiwa, all of Japan

[73] Assignee: Hitachi Medical Corporation, Tokyo, Japan

[21] Appl. No.: 343,382

[22] Filed: Apr. 26, 1989

[30] Foreign Application Priority Data

Apr. 28, 1988 [JP] Japan .................................. 63-107360

[51] Int. Cl.⁵ .......................... H04N 5/05; H04N 7/18
[52] U.S. Cl. ..................................... 358/138; 358/19; 358/111; 358/150
[58] Field of Search ................. 358/138, 111, 19, 148, 358/150, 151

[56] References Cited

U.S. PATENT DOCUMENTS

| | | | |
|---|---|---|---|
| 3,429,704 | 2/1969 | Ratliff | 358/3 |
| 4,204,225 | 5/1980 | Mistretta | 358/111 |
| 4,709,256 | 11/1987 | Lechner | 358/19 |
| 4,860,090 | 8/1989 | Murata | 358/19 |
| 4,881,124 | 11/1989 | Yokouchi | 358/111 |

Primary Examiner—Howard W. Britton
Attorney, Agent, or Firm—Antonelli, Terry, Stout & Kraus

[57] ABSTRACT

In an image input device, in which an image is photographed by a television camera using a plurality of operational modes having numbers of scanning lines different from each other, a video signal thus obtained is subjected to an analogue to digital conversion and a digital image signal is stored, one of a plurality of sampling clocks obtained by dividing a main clock is selected; the analogue to digital conversion is effected by using the sampling clock thus selected; and at the same time synchronization signals of the horizontal and the vertical scannings of the television camera are formed by counting the selected sampling clock.

6 Claims, 5 Drawing Sheets

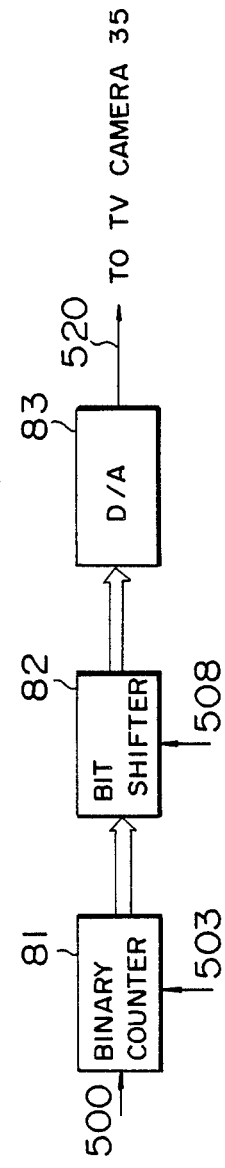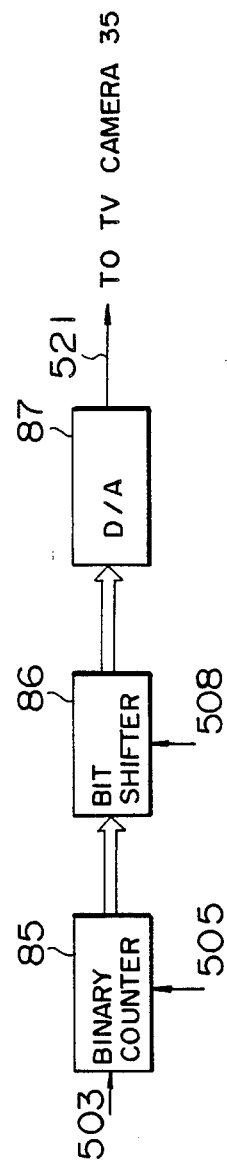

IMAGE INPUT DEVICE

BACKGROUND OF THE INVENTION

This invention relates to an image input device and in particular to a real time digital radiographic device for diagnosing a patient, while digitizing X-ray images in real time, taking-in them and proceeding to an image processing.

As a prior art real time digital radiographic (hereinbelow abbreviated to DR) device there is known, for example, a device described in JP-A-61-113432. The device described in the publication stated above was provided with scanning modes for two numbers of scanning lines, 525 and 1125. These two modes were switched over selectively, depending on the use, and images consisting of a number of pixels 512×512 or 1024×1024 were taken-in. On the other hand U.S. Pat. specification No. 4,204,225 describes the efficiency to increase the number of scanning lines for a television camera from 256 to 1024 and to proceed to a processing for taking-in a high resolving power image as well as various sorts of possible devices. Further, in JP-A-60-111635, it is described that a 4000 line scanning is also possible, taking it into account to use an image pickup tube of about 5 inch.

In addition, a co-pending application, U.S. Ser. No. 220,978, filed July 18, 1988 now U.S. Pat. No. 4,881,124, by a part of the applicants of this application describes the switching over of the scanning lines of 525 and 1050 and the change of the horizontal and the vertical scanning frequencies corresponding thereto.

However, according to these prior art techniques, the compatibility in the pixel unit, i.e. the fact that imaging is effected always with a same central position and a same image area for these plurality of operational modes, was not taken into account.

Furthermore, when a real time DR device of next generation provided with scanning modes of numbers of scanning lines greater than 1500 or 2000 is developed, restrictions are produced in the utilization of the techniques on hardwares, softwares, etc. developed for the existing devices and smooth exchange between different devices is difficult.

SUMMARY OF THE INVENTION

An object of this invention is to provide an image input device having the compatibility in the pixel unit, i.e. in which the imaging area is not changed, even if the number of scanning lines or the number of pixels or the frame rate is changed, when a same object is imaged.

Another object of this invention is to provide an image input device, for which device cost of the control circuit is low even for the switching over among a number of different operational modes, and addition and enlargement of operational modes are easy.

Still another object of this invention is to provide an image input device, which is matched easily with apparatuses developed on the basis of the television standard.

The characteristic structure of this invention consists in that it comprises an oscillator generating the main clock having a predetermined frequency; means for obtaining clocks having different frequencies by dividing the frequency of this main clock and selecting one of them; and means for counting the clock signal thus selected and generating the horizontal and the vertical synchronization signals as well as blanking control signals during the scanning in the horizontal and the vertical directions.

Another feature of this invention consists in that the frequency of the main clock described above is in a relation represented by a ratio expressed by an integer with respect to the color burst signal used in the television standard.

BRIEF DESCRIPTION OF THE DRAWINGS

FIGS. 5A and 5B are circuit diagrams indicating a part of the control circuit used in the embodiment stated above.

DESCRIPTION OF THE PREFERRED EMBODIMENTS

Figure 1:
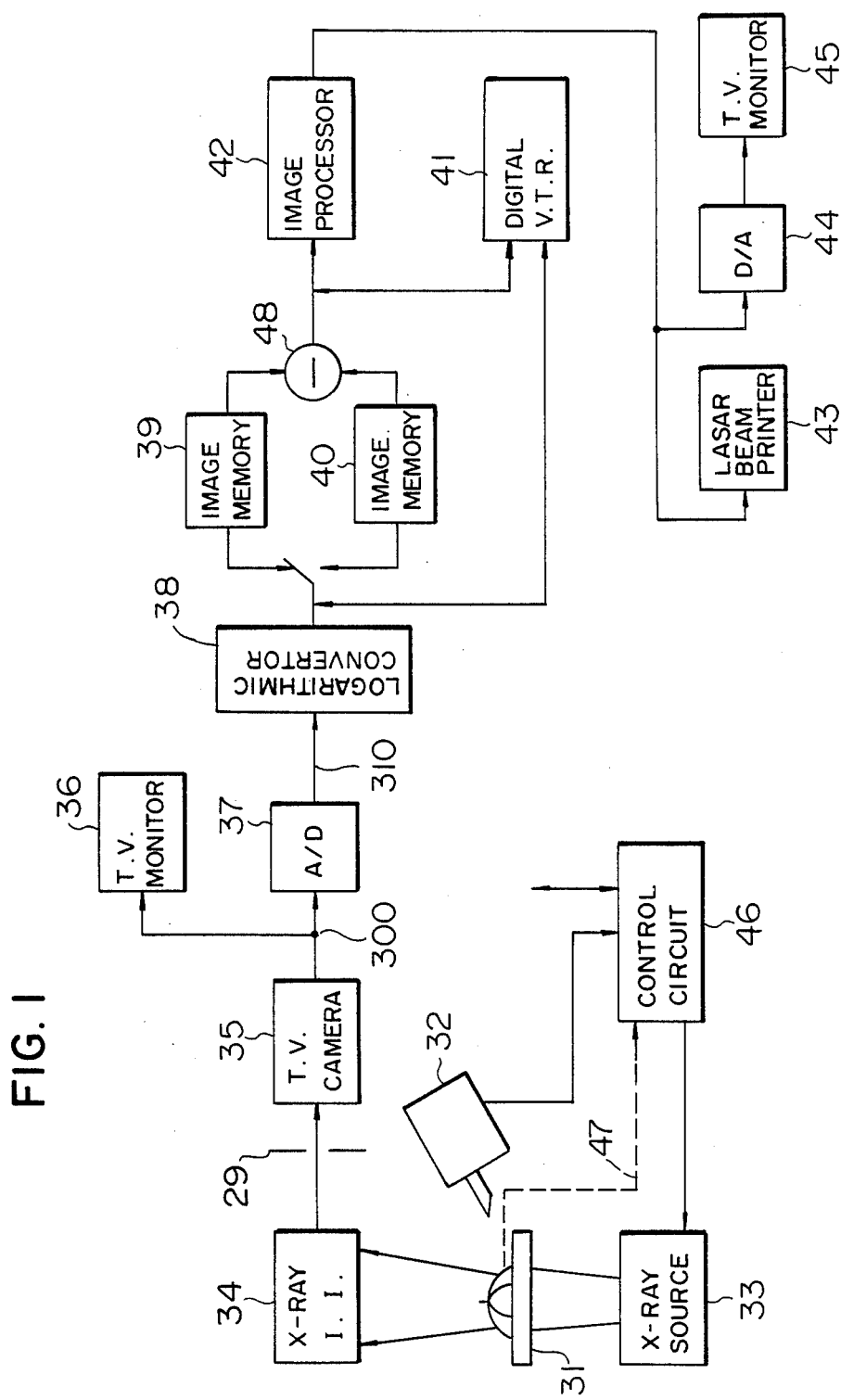
FIG. 1 is a block diagram illustrating the construction of a digital fluorographic device, which is an embodiment of this invention.

FIG. 1 is a block diagram, in the case where this invention is applied to a digital fluorographic (DF) device.

In FIG. 1, reference numeral 31 is a body to be examined; 32 is a contrast agent injector, 33 is an X-ray source; 34 is an X-ray image intensifier (X-II); 35 is a television camera; 29 is an optical diaphragm regulating the amount of incident light to the television camera 35; 36 is a television monitor, 37 is an analogue to digital converting circuit; 38 is a logarithmic converting circuit; 39 and 40 are image memories; 41 is digital VTR recording video data; 42 is an image processing circuit effecting image intensification, gamma transformation and so forth; 43 is a laser beam printer for forming a hard copy; 44 is a digital to analogue converting circuit; 45 is a television monitor; 46 is a control section controlling the whole device; and 47 is an electro cardiogram signal.

The television camera 35 is turned on the indicated scanning mode by an instruction of the control section 46 and the maximum value $i_{smax}$ of the signal current of the television camera is restricted by controlling the optical diaphragm 29 and the output of the X-ray source 33.

At first, the body to be examined 31, in which no contrast agent is injected, is imaged on the X-ray image intensifier 34 by irradiating it with X-ray generated by the X-ray source 33 and the data thus obtained is taken-in in the image memory 39 after having imaged it by means of the television camera 35 and subjected them to the analogue to digital convertion and the logarithmic conversion. At this time, since no contrast agent is injected, no blood vessel portion is imaged, but only the bone portion is imaged. This is called a mask image. Then contrast agent is injected in the body 31, which is irradiated with X-ray so as to be imaged by means of the television camera 35. The video signal coming from the television camera 35 is taken-in in the image memory 40 through the analogue to digital converting circuit 37 and the logarithmic converting circuit 38. This image is called live image. A subtractor 48 calculates the difference between the mask image and the live image so as to obtain a subtraction image. The subtraction image is one indicating the distribution of the contrast agent, i.e. one indicating only the blood vessel, which is outputted to the television monitor 45 or the laser beam printer 43 after having been subjected to a predetermined processing in the image processing circuit 42.

TABLE 1

| Mode Number | 1 | 2 | 3 | 4 | 5 | 6 |
|---|---|---|---|---|---|---|
| Number of scanning lines (Ms) | 525 | | 1050 | | 2100 | |
| Number of pixel (N × M) | 512 × 512 | | 1024 × 1024 | | 2048 × 2048 | |
| $N_S$ | 616 pixels | | 1232 pixels | | 2464 pixels | |
| $N_R$ | 48 pixels | | 96 pixels | | 192 pixels | |
| $N_{BL}$ | 104 pixels | | 208 pixels | | 416 pixels | |
| $M_R$ | 8 lines | | 16 lines | | 32 lines | |
| $M_{BL}$ | 13 lines | | 26 lines | | 52 lines | |
| Sampling clock frequency $f_0$ (MHz) | 9.6923 ($f_{01}$) | 19.3846 ($f_{02}$) | 9.6923 ($f_{01}$) | 19.3846 ($f_{02}$) | 9.6923 ($f_{01}$) | 19.3846 ($f_{02}$) |
| $f_h$ (KHz) | 15.734 | 31.469 | 7.867 | 15.734 | 3.934 | 7.867 |
| $f_v$ (Hz) | 29.97 | 59.94 | 7.493 | 14.98 | 1.87 | 3.746 |
| a | 1 | 1 | 2 | 2 | 4 | 4 |
| b | 1 | 2 | 1 | 2 | 1 | 2 |

Table 1 indicates a plurality of operational modes in the embodiment indicated in FIG. 1. On the other hand, FIG. 2 indicates the relation between the scanning and the image taking-in area in the TV camera 35 in the relation therewith.

Figure 2:
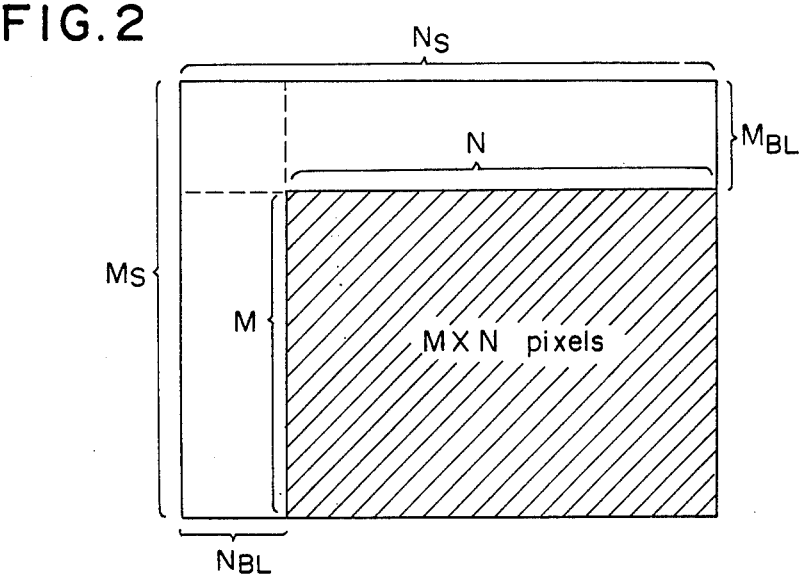
FIG. 2 is a conceptional scheme indicating the region of the scanning and the taking-in for a TV camera used in the embodiment stated above.

The operational mode 1 in Table 1 is basic one having a number of scanning lines of 525 and a number of taken-in pixels of 512×512. The sampling clock frequency $f_0$ for the analogue to digital conversion of the video signal is given by $f_{01} = 9.6923$ MHz. The number of clocks per one horizontal period, i.e. $N_S$ in FIG. 2 is 616; the horizontal synchronization frequency $f_h = 15.734$ kHz; and the vertical synchronization frequency $f_v = 29.97$ Hz. Further the number of clocks during the blanking period in one horizontal scanning period, i.e. $M_{BL}$ FIG. 2, is 13. On the other hand, in operational modes 3 and 5 in Table 1, the numbers of scanning lines $M_S$ are two times and four times, respectively, as great as that in the operational mode 1. The numbers of taken-in pixels are 1024×1024 and 2048×2048, respectively. These operational modes are characterized in that, if the number of scanning lines $M_S$ is a times as great as that in the operational mode 1, all the numbers of taken-in pixels in the vertical and the horizontal directions, M and N, the horizontal scanning period and the horizontal blanking period are multiplied by a. Since the sampling clock frequency $f_0$ remains unchanged, the number of clocks $N_S$ per one horizontal period as well as the number of clocks $N_{BL}$ during the horizontal period are a times as great as those of the operational mode 1. Further the vertical synchronization frequency $f_v$ is multiplied by $1/a^2$ and the number of lines during the vertical blanking period is multiplied by a. In the operational modes 2, 4 and 6 the sampling clock frequency $f_0$ for the analogue to digital conversion is doubled with respect to those in the operational modes 1, 3 and 5, respectively, i.e. $f_{02} = 19,3846$ MHz. For example, in the operational mode 6, the horizontal period and the horizontal blanking period are reduced to a half with respect to those of the operational mode 5, but the values of $N_S$ and $N_{BL}$ remain unchanged from those of the operational mode 5. $M_S$ and $M_{BL}$ remain also unchanged from those of the operational mode 5 and the vertical synchronization frequency $f_v$ is doubled. In the switching over of these modes 1 to 6, the numbers of the vertical and the horizontal taken-in pixels are proportional to the number of scanning lines and the ratio of the scanning period to the blanking period is constant, independently of the change in the scanning period due to the change of the operational mode.

Figure 3:
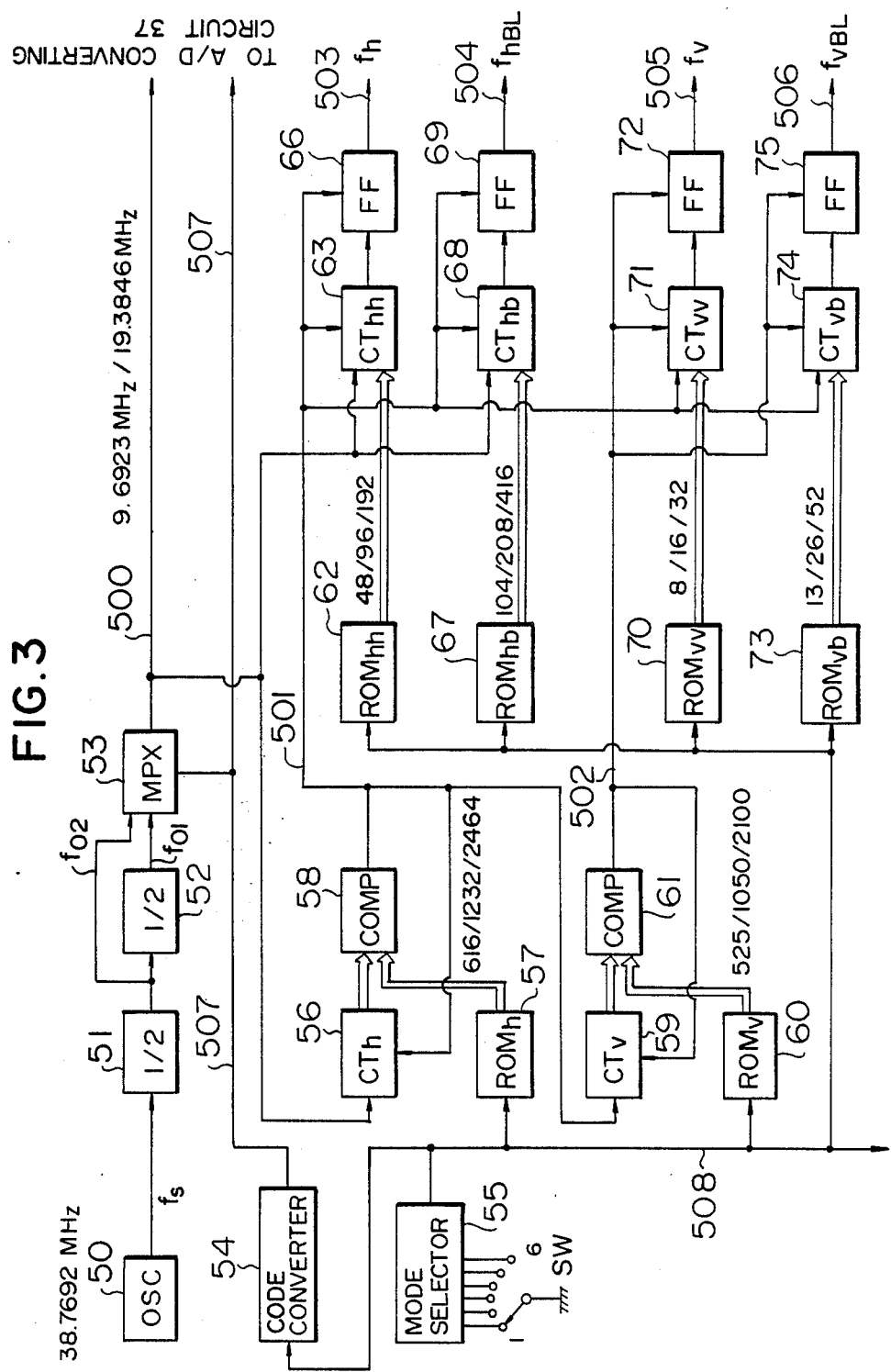
FIG. 3 is a circuit diagram for the principal part of the control circuit used in the embodiment stated above.

FIG. 3 indicates the principal part of the control portion 46 of the device indicated in FIG. 1. An oscillating circuit 50 generates the main clock having a frequency $f_s = 38.7692$ MHz. The frequency of this main clock is selected so as to be a frequency having a ratio of an integer with respect to the color burst signal frequency $f_{sc}$ of the television standard. In the case of this example $f_s$ is selected so as to be the product of the color burst signal frequency of the NTSC system $f_{sc} = 3.579545$ MHz multiplied by 704/65. In this way it is possible to form the color burst signal, starting from the main clock. ½ dividers 51 and 52 divide successively the main clock described above. In this way it is possible to obtain a sampling clock $f_{01} = 9.6923$ MHz from the divider 52 and another sampling clock $f_{02} = 19.3846$ MHz from the divider 51. Both of them are connected with a multiplexer 53 and one of them is selected, which is given to the analogue to digital converter 37. Since the analogue to digital conversion is effected by using one of the sampling clocks thus obtained by dividing the main clock $f_c$, the frequency of this sampling clock has a ratio of an integer with respect to the frequency of the color burst signal. In this way it is possible to apply easily apparatuses such as VTR, etc. fabricated on the basis of the NTSC system to this device. A mode selector 55 generates a code signal 508 assigning one of the operational modes 1 to 6 indicated in Table 1 according to the accompanying selection by the commutating switch. A code converter 54 generates a signal 507 distinguishing the operational modes 1 to 6, depending on the value of b. In this example, the signal 507 is at the 0 level for the modes 1, 3 and 5 and at the 1 level for the modes 2, 4 and 6. The clock 500 selected by the multiplexer 53 is assigned by the signal 507 and forms the sampling clock $f_{01}$ or $f_{02}$.

Figure 4A:
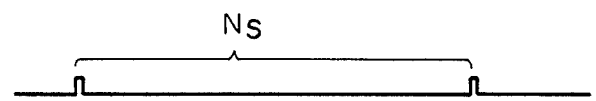
FIGS. 4A to 4H show waveforms for explaining the operation of the circuit indicated in FIG. 3.
Figure 4B:
Figure 4C:
Figure 4D:
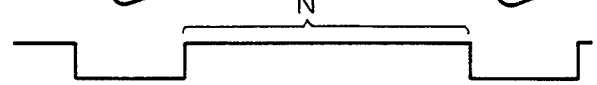

This selected clock 500 is supplied to counters 56, 63 and 68, which determine the horizontal scanning period, the waveform of the horizontal synchronization signal and the blanking period of the horizontal scanning, respectively. Explanation is made, referring to FIGS. 4A to 4D. A read only memory (ROM) stores the values of $N_S$ (616, 1232 and 2464) for each of the modes and one of these values is selected by the code signal 508 specifying the mode, which is given to a comparator 58. The counter 56 counts the clock 500. When the value thereof is in accordance with $N_S$ given to the comparator 56, the comparator 56 generates a pulse-shaped signal 501 and at the same time the counter 56 is cleared. In this way the signal 501 becomes a signal indicating one horizontal scanning period, as indicated in FIG. 4A. Another ROM 62 stores the numbers of clocks $N_R$ (refer to $N_S$ in Table 1) corresponding to the width of the horizontal synchronization signal for each of the operational modes. The value of one of them is selected by a code signal 508 specifying the mode and given to the counter 63. A flipflop 66 is set by the signal 501 and on the other hand the counter 63 loads it with the value of $N_R$. Thereafter the counter 63 counts down by the clock 500, and resets the flipflop 66, when the value thereof reaches zero. In this way the Q output of the flipflop 66 is the horizontal synchronization signal 503 indicated in FIG. 4B. The constructions of an ROM 67, a counter 68 and a flipflop 69 are completely identical to those of the ROM 62, the counter 63 and the flipflop 66, respectively. However the ROM 67 stores the number of clocks $N_{BL}$ corresponding to the blanking period of the horizontal scanning for each of the operational modes indicated in Table 1. The horizontal blanking control signal 504 indicated in FIG. 4D is obtained by an operation similar to that described above.

Figure 4E:
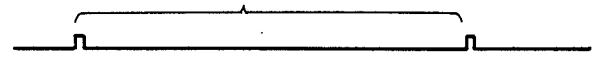
Figure 4F:
Figure 4G:
Figure 4H:
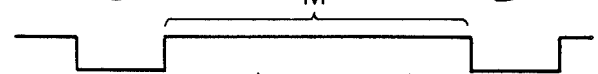

The signal 501 indicating one horizontal scanning period described above is used also for forming the vertical synchronization signal $f_v$ indicated in FIG. 4F and the vertical blanking control signal 506 indicated in FIG. 4H. That is, the counter 59 counts, using the signal 501 as the clock. In this way, a signal 502 indicating one vertical scanning period (refer to FIG. 4E) is obtained by an ROM 60 storing the number of scanning lines $M_S$ for each of the operational modes and a comparator 61 (constructed identically to those of the ROM 57 and the comparator 58). Further an ROM 70 and another ROM 73 store the number of scanning lines $M_R$ corresponding to the width of the vertical synchronization signal and the number of scanning lines $M_{BL}$ corresponding to the vertical blanking period, respectively, for each of the operational modes indicated in Table 1. The operations of counters 71 and 74 and flipflops 72 and 75 are completely identical to those of the counters 63 and 68 and the flipflops 66 and 69, except that the signal 501 is used as the clock and the signal 502 is used as the load and set signal. In this way a vertical synchronization signal (FIG. 4D) and the vertical blanking control signal 506 (FIG. 4G) corresponding to the operational mode are obtained from the flipflops 72 and 75, respectively.

As indicated above, in the control circuit indicated in FIG. 3, since the synchronization signals are generated on the basis of the sampling clock 500 of the analogue to digital converter and further all the values of $N_S$, N, $N_{BL}$, $N_R$, $M_S$, M, $M_{BL}$ and $M_R$ are multiplied by a with respect to those of the mode 1, all the signals of $f_h$, $f_v$, $f_{hBL}$ and $f_{vBL}$ have always waveforms contracted or elongated in the direction of the time axis of a same waveform, independently of changes in the scanning synchronization or the number of pixels. Furthermore, in order that the imaging area of the TV camera remains unchanged, independently of changes in the operational mode, the sweep widths in the horizontal and the vertical directions should be constant. FIG. 5A shows an example of the circuit generating such a horizontal sweep signal and FIG. 5B shows an example of the circuit generating such a vertical sweep signal. A binary counter 81 of 12 bits counts up the clock 500 only during the period, where the horizontal synchronization signal 503 is at the high level. Furthermore the content thereof is cleared, when the signal is turned over to the low level. The content of the counter 81 is given to a digital to analogue converter 83 of 12 bits through a bit shifter 82. The bit shifter 82 changes the position of the input bit of the digital to analogue converter, depending on a code signal 508 specifying the mode. In the case of the modes 5 and 6, the output of the counter 81 is inputted in the digital to analogue converter 83, as it is, without any bit shift. In the case of the modes 3 and 4, the bit shifter 82 shifts the outputs of $2^0$ bit to $2^{10}$ bit of the counter 81 by 1 bit and inputs them in the inputs of $2^1$ bit to $2^{11}$ bit of the digital to analogue converter 83. In the case of the modes 1 and 2, the bit shifter 82 shifts the outputs of $2^0$ bit to $2^9$ bit of the counter 81 by 2 bits and inputs them in the inputs of $2^2$ bit to $2^{11}$ bit of the digital to analogue converter 83. Owing to this construction the horizontal sweep signal 520 indicated in FIG. 4C, whose sweep width remains unchanged, independently of the mode change, can be obtained from the digital to analogue converter 83. A binary counter 85 indicated in FIG. 5B counts up the horizontal synchronization signal 503, the signal clear and the counter disclosure being controlled by the vertical synchronization signal 505. The construction and the connection of the bit shifter 86 and the digital to analogue converter 87 are identical to those of the bit shifter 82 and the digital to analogue converter 83 and a vertical sweep signal 521 (FIG. 4G), whose sweep width remains unchanged, is obtained by an operation similar to that described above.

Figure 6:
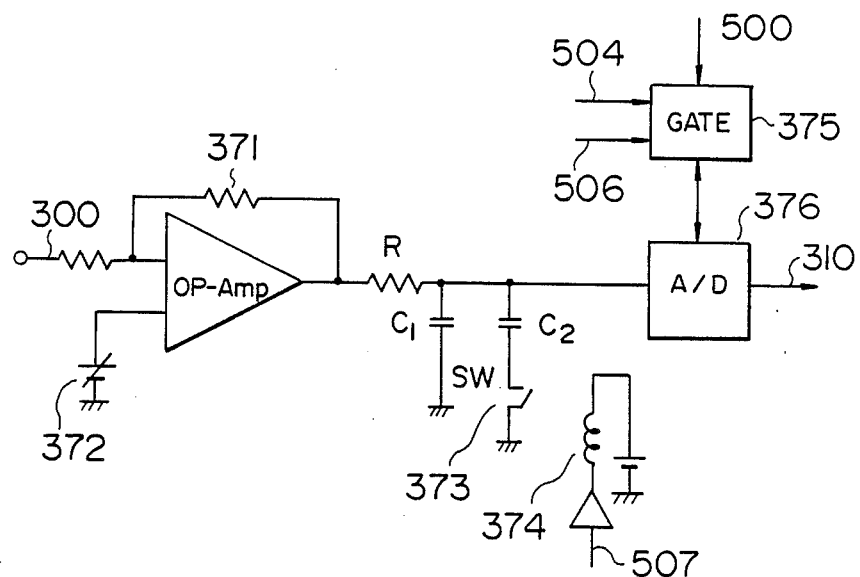
FIG. 6 is a circuit diagram of the analogue to digital converting circuit used in the embodiment stated above.

FIG. 6 shows the construction of the analogue to digital converting circuit 37 indicated in FIG. 1. The image signal 300 from the TV camera 35 is amplified by an amplifier 371 and applied to an analogue to digital converter 376. The band of the amplified signal is determined by an output resistance R and capacitances $C_1$ and $C_2$. In the case of the modes 2, 4 and 6 indicated in Table 1, since the sampling frequency for the analogue to digital conversion is doubled with respect to that of the modes 1, 3 and 5, a switch 373 is turned-off by means of a coil 374 driven by a signal 507 and the signal band is enlarged. The clock 500 selected by the multiplexer 53, as described above, is used as the sampling clock. A gate 375 makes the clock 500 pass through to give it to the analogue to digital converter 376, only when both the blanking control signals $f_{hBL}$ and $f_{vBL}$ are at the high level.

Although, in the embodiment described above, M=N for all the mode, it is also possible to obtain an image having a rectangular image matrix, in which M≠N. For example, supposing pixels of 480×512 for the modes 1 and 2, pixels should be 960×1024 for the modes 3 and 4 and 920×2048 for the modes 5 and 6 so that the ratio of M to N is always constant.

Determining the number of scanning lines $N_S$ and the clock frequency $f_{01}$ for the analogue to digital conversion, which are fundamental data, it is possible to effect similarly the switching over of not only the 6 operational modes indicated in Table 1 but also more operational modes.

TABLE 2

| CLOCK FREQUENCY FOR ANALOGUE TO DIGITAL CONVERSION ($f_0$) | FREQUENCY BAND | NUMBER OF SCANNING LINES $N_S$ | | | | | | | |
|---|---|---|---|---|---|---|---|---|---|
| | | 525 LINES | | 1050 LINES | | 1575 LINES | | 2100 LINES | |
| | | NUMBER OF TAKEN-IN PIXELS (M × N × PIXELS) | | | | | | | |
| | | 512 × 512 | | 1024 × 1024 | | 1536 × 1536 | | 2048 × 2048 | |
| | | HORIZONTAL AND VERTICAL SYNCHRONIZATION FREQUENCY | | | | | | | |
| | | $fh_1$ | $fv_1$ | $fh_2$ | $fv_2$ | $fh_3$ | $fv_3$ | $fh_4$ | $fv_4$ |
| 9.6923 MHz ($f_{01}$) | 4.846 MHZ | 15.734 KHz | 29.97 Hz | 7.867 KHz | 7.49 Hz | 5.245 KHz | 3.33 Hz | 3.934 KHz | 1.87 Hz |
| 19.3846 MHz ($f_{02}$) | 9.692 MHz | 31.469 KHz | 59.94 Hz | 15.734 KHz | 14.99 Hz | 10.490 KHz | 6.66 Hz | 7.867 KHz | 3.746 Hz |
| 29.0769 MHz ($f_{03}$) | 14.538 MHz | 47.203 KHz | 89.91 Hz | 23.601 KHz | 22.48 Hz | 15.734 KHz | 9.99 Hz | 11.801 KHz | 5.62 Hz |
| 38.7692 MHz ($f_{04}$) | 19.385 MHz | 62.937 KHz | 119.88 Hz | 31.469 KHz | 29.97 Hz | 20.979 KHz | 13.32 Hz | 15.734 KHz | 7.49 Hz |

| CLOCK FREQUENCY FOR ANALOGUE TO DIGITAL CONVERSION ($f_0$) | FREQUENCY BAND | NUMBER OF SCANNING LINES $N_S$ | | | | | | | |
|---|---|---|---|---|---|---|---|---|---|
| | | 2625 LINES | | 3150 LINES | | 3675 × 3675 | | 4200 × 4200 | |
| | | NUMBER OF TAKEN-IN PIXELS (M × N PIXELS) | | | | | | | |
| | | 2560 × 2560 | | 3072 × 3072 | | 3584 × 3584 | | 4096 × 4096 | |
| | | HORIZONTAL AND VERTICAL SYNCHRONIZATION FREQUENCY | | | | | | | |
| | | $fh_5$ | $fv_5$ | $fh_6$ | $fv_6$ | $fh_7$ | $fv_7$ | $fh_8$ | $fv_8$ |
| 9.6923 MHz ($f_{01}$) | 4.846 MHz | 3.147 KHz | 1.20 Hz | 2.622 KHz | 0.83 Hz | 2.248 KHz | 0.61 Hz | 1.967 KHz | 0.47 Hz |
| 19.3846 MHz ($f_{02}$) | 9.692 MHz | 6.294 KHz | 2.40 Hz | 5.245 KHz | 1.67 Hz | 4.496 KHz | 1.22 Hz | 3.934 KHz | 0.94 Hz |
| 29.0769 MHz ($f_{03}$) | 14.538 MHz | 9.441 KHz | 3.60 Hz | 7.867 KHz | 2.50 Hz | 6.743 KHz | 1.83 Hz | 5.900 KHz | 1.40 Hz |
| 38.7692 MHz ($f_{04}$) | 19.385 MHz | 12.587 KHz | 4.80 Hz | 10.490 KHz | 3.33 Hz | 8.991 KHz | 2.45 Hz | 7.867 KHz | 1.87 Hz |

Table 2 shows the horizontal synchronization frequency $f_h$ the vertical synchronization frequency $f_v$ for 8 kinds of a=1, 2, 3, 4, 5, 6, 7 and 8 and 4 kinds of b=1, 2, 3 and 4, i.e. in total 32 kinds of the operational modes, supposing $N_{S1}$=525 and $f_{01}$=9.6923 MHz.

We claim:

1. An image input device comprising:
   a television camera transforming an image by a line to line scanning into a time sequential video signal;
   analogue to digital converting means for sampling successively said video signal and converting it into a digital signal;
   image storing means for storing said digital signal;
   mode specifying means for generating a mode specifying signal for selecting one of a plurality of sorts of operational modes of said television camera; and
   control means including an oscillator generating a main clock; dividing means forming a plurality of sorts of sampling clocks by dividing the main clock coming from said oscillator; selecting means for selecting one of said plurality of sorts of sampling clocks by said mode specifying means to give it to said analogue to digital converting means; and synchronization signal forming means for forming synchronization signals determining horizontal and vertical scanning periods as well as a blanking period in the scanning by counting the sampling clocks thus selected.

2. An image input device according to claim 1, wherein the frequency of said main clock is in a relation expressed by a ratio of an integer with respect to the frequency of the color burst signal of the television standard.

3. An image input device according to claim 1, wherein at least one of said plurality of scanning modes has a number of scanning lines greater than 2000.

4. An image input device according to claim 1, further comprising band control means for controlling the band of the video signal lead from said television camera to said analogue to digital converting means, depending on the output of said selection means.

5. An image input device according to claim 1, wherein said synchronization signal forming means stores the number of clocks $N_S$ per one horizontal scanning period, the number of clocks $N_R$ corresponding to the width of the horizontal synchronization signal, the number of clocks $N_{BL}$ corresponding to the blanking period of the horizontal scanning, the number of scanning lines $M_S$ per one vertical scanning period, the number of scanning lines $M_R$ corresponding to the blanking period of the vertical scanning, and the number of scanning lines $M_{BL}$ corresponding to the blanking period of the horizontal scanning for each of a plurality of operational modes, and it comprises further memory means outputting values of $N_S$, $N_R$, $N_{BL}$, $M_S$, $M_R$ and $M_{BL}$ corresponding to the operational mode selected by said mode specifying signal; first counting means for generating a first signal corresponding to one horizontal scanning period by counting said selected sampling clock and comparing the count with the value of $N_S$ outputted by said memory means; second counting means for generating a second signal corresponding to one vertical scanning period by counting the output of said first counting means and comparing the count with the value of $M_S$ outputted by said memory means; first synchronization signal forming means for generating a horizontal synchronization signal on the basis of said selected sampling clock, said first signal and the value of $N_R$ outputted by said memory means; second synchronization signal forming means for generating a horizontal blanking control signal on the basis of said selected sampling clock, said first signal and the value of $N_{BL}$ outputted by said memory means; third synchronization signal forming means for generating a vertical blanking control signal on the basis of said first and said second signals and the value of $M_R$ outputted by said memory means; and fourth synchronization signal forming means for generating a vertical blanking control signal on the basis of said first and said second signals and the value of $M_{BL}$ outputted by said memory means.

6. An image input device according to claim 5, wherein said plurality of scanning modes comprise at least a first scanning mode, serving as the basic mode and a second scanning mode, in which the values of $N_S$, $N_R$, $N_{BL}$, $M_S$, $M_R$ and $M_{BL}$ are a times as great as those of the first scanning mode, respectively.

* * * * *